UNITED STATES PATENT OFFICE.

JOHN B. THOMS, OF BALTIMORE, MARYLAND, ASSIGNOR OF ONE-HALF HIS RIGHT TO SAMUEL ECCLES, JR., OF SAME PLACE.

IMPROVEMENT IN THE PROCESSES OF EXTRACTING SUGAR FROM MOLASSES.

Specification forming part of Letters Patent No. 144,369, dated November 4, 1873; application filed June 11, 1873.

*To all whom it may concern:*

Be it known that I, JOHN B. THOMS, of Baltimore, Maryland, have invented an Improvement in the Process of Extracting Sugar from Molasses, of which the following is a specification:

It is well known that molasses rapidly deteriorates in sugar-making properties from the time it is produced, (the deterioration being more rapid in hot weather,) and that in a few months it wholly loses its value for the purposes of sugar manufacture. During a large part of the autumn and winter months the business of extracting sugar from molasses is entirely suspended, from the fact that the molasses at that time is too poor in sugar to be worked to a profit.

My invention has a threefold object, namely, to arrest and thereafter to prevent the deterioration referred to, to increase the percentage of sugar obtainable from the molasses, and to enable sugar-makers to prolong their working season, or, if they so desire, to carry on their manufacturing operations continuously all the year round.

My process consists in boiling the molasses of commerce, either in a vacuum or otherwise, down to "proof," or to a less degree of concentration, then storing the product for any period not less than about a month, and afterward completing the process of extracting the sugar, at the will of the manufacturer, by treating the concentrated product for the separation of the sugar in centrifugal or other apparatus, such as is usually employed for the purpose; or, in case the molasses is not boiled to proof in the first instance, then, after the storing, the boiling operation is completed before the concentrated product is treated, as above mentioned, for the separation of the sugar.

I much prefer that the molasses should be fully boiled—that is, boiled to the point of proof—in the first instance, before the storing of the concentrated product, as deterioration of the molasses is thus completely arrested, and the percentage of sugar derivable from it is increased.

But little, if any, of the commercial advantages which flow from the facility my process affords for extending the working season are to be secured by storing the concentrated product for less time than about a month; and to derive the full advantages the product should be stored from four to five months. Beyond the minimum mentioned the length of the period of storage is to be regulated by the convenience of the manufacturer.

I claim—

The described process for arresting and preventing the deterioration of the sugar-making properties of molasses, for increasing the percentage of sugar product, and for prolonging the sugar-making season, or rendering the extraction of sugar from molasses a continuous operation, at the will of the manufacturer, through all seasons of the year, substantially as set forth.

JOHN B. THOMS.

Witnesses:
   S. ECCLES, Jr.,
   THOS. MURDOCH.